United States Patent [19]

Gardner

[11] Patent Number: 5,346,031

[45] Date of Patent: Sep. 13, 1994

[54] HYBRID MOTOR VEHICLE HAVING AN ELECTRIC MOTOR AND UTILIZING AN INTERNAL COMBUSTION ENGINE FOR FAST CHARGE DURING CRUISE MODE OFF CONDITION

[76] Inventor: Conrad O. Gardner, 22905 108th Ave. W., Edmonds, Wash. 98020

[21] Appl. No.: 140,507

[22] Filed: Oct. 25, 1993

Related U.S. Application Data

[63] Continuation of Ser. No. 867,412, Apr. 13, 1992, Pat. No. 5,301,764.

[51] Int. Cl.$^5$ .............................................. B60L 11/02
[52] U.S. Cl. .................................... 180/179; 180/65.2; 180/65.4
[58] Field of Search ............. 180/165, 178, 179, 65.1, 180/65.2, 65.3, 65.4, 65.8

[56] References Cited

U.S. PATENT DOCUMENTS

| | | | |
|---|---|---|---|
| 3,615,829 | 10/1971 | Sprague | 136/6 |
| 3,788,284 | 1/1974 | Gardner | 123/119 A |
| 3,791,752 | 2/1974 | Gardner | 404/2 |
| 4,021,677 | 5/1977 | Rosen et al. | 290/40 R |
| 4,042,056 | 8/1977 | Horwinski | 180/65.2 |
| 4,165,795 | 8/1979 | Lynch et al. | 180/65 A |
| 4,180,138 | 12/1979 | Shea | 180/65.2 |
| 4,313,080 | 1/1982 | Park | 320/61 |
| 4,351,405 | 9/1982 | Fields et al. | 180/65.2 |
| 4,400,997 | 8/1983 | Fiala | 74/661 |
| 4,438,342 | 3/1984 | Kenyon | 180/65.2 X |
| 4,469,187 | 9/1984 | Hagin et al. | 180/14.2 |
| 4,511,012 | 4/1985 | Rauneker | 180/65.2 |
| 4,533,011 | 8/1985 | Heidemeyer et al. | 180/65.2 |
| 4,562,894 | 1/1986 | Yang | 180/65.2 |
| 4,568,096 | 2/1986 | Yew et al. | 280/6.1 |
| 4,616,170 | 10/1986 | Urstoger | 320/5 |
| 4,878,472 | 11/1989 | Hibino | 123/489 |
| 4,915,898 | 4/1990 | Wolff et al. | 419/3 |
| 4,923,025 | 5/1990 | Ellers | 180/65.2 |

Primary Examiner—Margaret A. Focarino
Assistant Examiner—Michael Mar
Attorney, Agent, or Firm—Conrad O. Gardner

[57] ABSTRACT

A hybrid motor vehicle utilizing electric motor propulsion prior to cruise mode detection condition and internal combustion engine propulsion during cruise mode.

6 Claims, 3 Drawing Sheets

HYBRID MOTOR VEHICLE HAVING AN ELECTRIC MOTOR AND UTILIZING AN INTERNAL COMBUSTION ENGINE FOR FAST CHARGE DURING CRUISE MODE OFF CONDITION

RELATED APPLICATIONS

This is a continuation of application Ser. No. 07/867,412 filed Apr. 13, 1992 now U.S. Pat. No. 5,301,764.

BACKGROUND OF THE INVENTION

Electric propulsion systems for motor vehicles have been proposed to completely eliminate emissions; however, as is well known, present technology requires bulky batteries which have to be recharged for long periods of time. The capacity of such batteries provide only limited range for the motor vehicle. One solution to this problem is shown in my U.S. Pat. No. 3,791,752 issued Feb. 12, 1974, where the on-board electrical power pack is required until electrical power can be derived from an electrified highway system. Unfortunately, the capital investment required for such systems is not available at this time and an alternative solution to the long battery charge problem is shown subsequently herein as a preferred embodiment of the present invention.

Automobile manufacturers have been devoting enough efforts through R and D funding to satisfy E.P.A. requirements by utilizing electronic controls to control emissions from I.C. engines over their entire operating range, viz., during acceleration, etc., and over a great range of power demands and wide range of speeds. However valiant such efforts are considered from an environmental standpoint, such efforts to clean up emissions over the entire operating range have been only moderately successful, at best.

The first effort utilizing electronic modulation (and 13th patent found in the U.S. Patent and Trademark office, Class 123, Subclass 57, containing over 300 issued patents) to control EGR flow and control emissions is shown in my U.S. Pat. No. 3,788,284 issued Jan. 29, 1974.

Hybridization has been recognized where the I.C. (internal combustion) engine is operated at maximum efficiency and lowest possible emissions in a series or parallel configuration with the electric propulsion system as seen in U.S. Pat. No. 4,021,677 issued Mar. 3, 1975. In such a hybrid system, the I.C. system utilizes the electric motor for supplementary power at heavy power demand times.

Another hybrid drive I.C., electric propulsion combination is shown in U.S. Pat. No. 4,165,795 issued Aug. 28, 1979, wherein the I.C. engine is operated in an optimum mode at a substantially constant speed and power level in which the I.C. engine produces the least amount of pollutants.

As for operation of I.C. engine propelled systems, automobile manufacturers have struggled to control the air-fuel ratio of a mixture supplied to the engine to a stoichiometric mixture ratio for best conversion efficiency of a three-way catalyst in the exhaust system for best emission characteristics (see, e.g., U.S. Pat. No. 4,878,472 issued Nov. 7, 1989).

BRIEF SUMMARY OF THE INVENTION

A hybrid I.C., electric motor propulsion system which shifts to I.C. engine propulsion for vehicle operation when the cruise mode is reached. Cruise mode occurs when rapidly shifting power and speed demands are not occurring for predetermined periods of time. In the cruise mode, propulsion is provided by a smaller I.C. engine operating within a small range of speeds about its most efficient operating speed from a power and pollutant output standpoint. In the cruise mode as defined, only a substantially constant power output level is required to propel the vehicle along the highway, since demands by cruise level definition are not changing but are substantially constant. When the non-electric cruise mode power plant, e.g., the I.C. engine, is not employed to drive the motor vehicle, the non-electric power plant is utilized to charge a fast charge-discharge battery.

DETAILED DESCRIPTION OF THE PREFERRED EMBODIMENT

Figure 1:
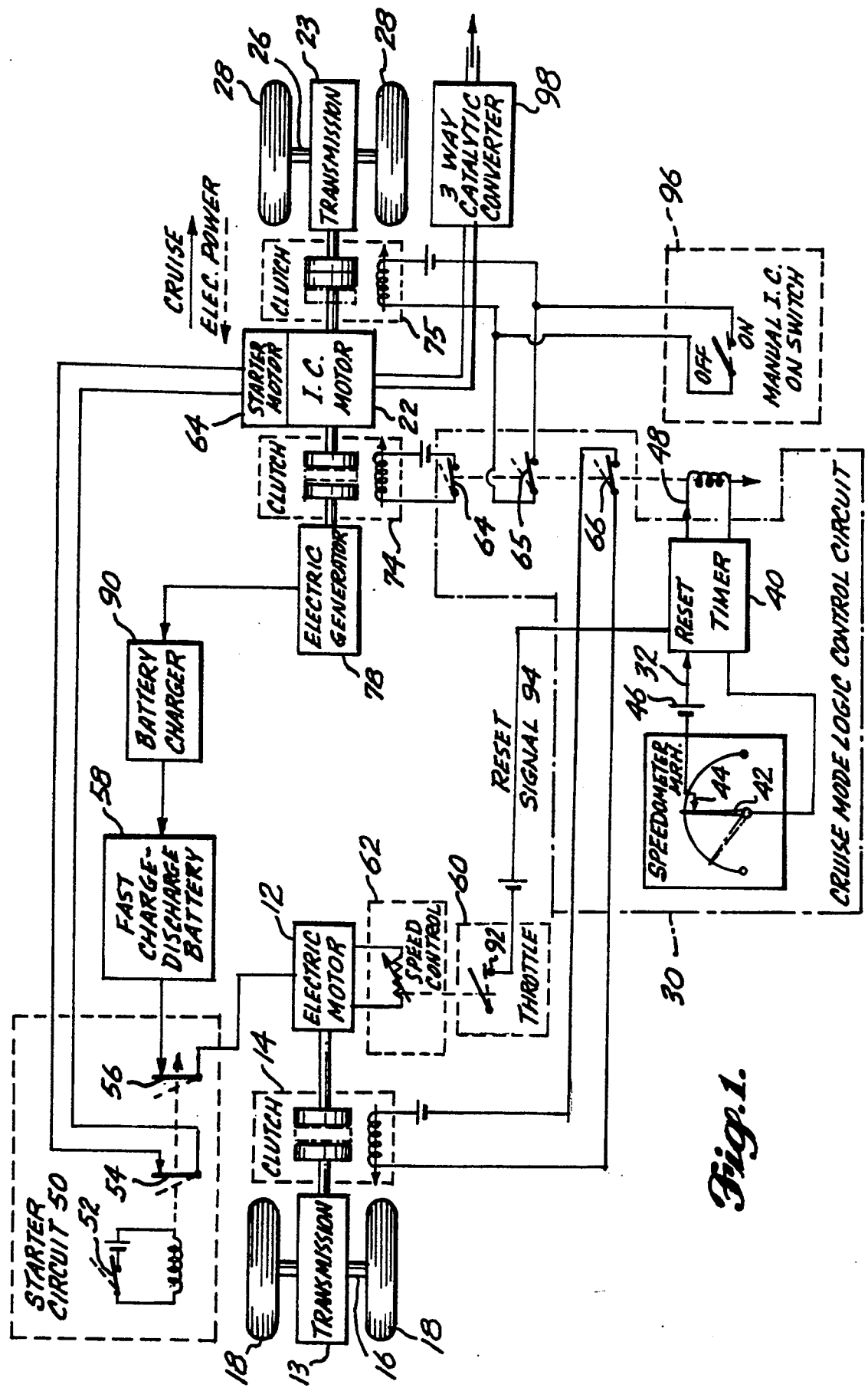
FIG. 1 is a schematic diagram of a preferred-embodiment of the present hybrid motor vehicle system, shown during cruise mode operation.

The hybrid motor vehicle propulsion system of FIG. 1 for motor vehicles utilizes an electrically operated power plant comprising an electric motor 12 coupled by means of a drive shaft through a clutch 14 to provide driving power through a first axle 16 to a pair of wheels 18 of the motor vehicle. A nonelectrically operated power plant comprising an internal combustion (I.C.) engine 22 provides driving power through a second axle 26 to a further pair of wheels 28. Separate drive of each of two axles greatly simplifies the complexity of what would be required if both the electric and non-electric power plants were attempted to be coupled to drive the same axle and pair of wheels, since the characteristics of each are different with attendant design requirements. In the present system, the non-electric power plant comprising, e.g., I.C. engine 22, is utilized in the cruise mode as described hereinafter in more detail, while the electric power plant comprising electric motor 12 is utilized primarily when conditions for cruise mode operations are not satisfied. In the interests of providing a low pollution, high-performance vehicle, electric motor 12 is utilized to power the vehicle during acceleration (when pollutant levels from state-of-the-art I.C. powered motor vehicles is high), while I.C. engine 22 is utilized to power the vehicle during cruise mode of operation. Electric motor 12 develops maximum torque at low speeds when high torque is necessary for acceleration, and I.C. engine 22 not being powerful at low rotational speeds is utilized in the present system during the cruise mode when less power is required, resulting in utilization in the present system of a lower horsepower I.C. engine (e.g., 20 to 30 percent of the horsepower of present I.C. powered vehicles), which lower horsepower engine can then be operated under a restricted set of conditions at relatively constant speed and low load demands in the cruise mode. Since I.C. engine 22 is operated under a restricted set of conditions, unlike the many conditions of operation of present I.C.-only powered vehicles, it becomes possible to adjust the engine for optimum efficiency and minimal emission output. While transmission 13 has been shown in the schematic, such may comprise, e.g., a one-to-one ratio direct drive transmission for electric motor 12, with transmission 23 offering the system designer flexibility, also, in coupling power from I.C. engine 22 to rear wheels 28.

CRUISE MODE OPERATION

Turning now to cruise mode logic control circuit 30, which is a small computer in which a vehicle speed signal above a predetermined level (e.g., 40 miles per hour) generates an ON signal 32 to start timer circuit 40. ON signal 32 is provided when the speedometer indicator needle 42 closes switch 44 in circuit with battery voltage source 46. Switch 44 stays closed at all speeds above a predetermined level shown here as 40 mph. Timer circuit 40 is set for a predetermined time interval (e.g., 45 seconds) after being turned into an ON condition by ON signal 32, so that a cruise mode logic output signal 48 is only provided under two conditions: First, the speed of the vehicle must be above 40 mph; and second, that speed must be maintained for at least the predetermined time interval of e.g., 45 seconds. If the speed drops below 40 mph, then timer circuit 40 waits until at least a 40 mph speed is detected by the closing of switch 44, again starting timer circuit 40 for a determination that ON signal 32 is at least present again for the predetermined time period of 45 seconds.

Turning now to starter circuit 50 of FIG. 1, it can be seen that with the initial closing of switch 52 by the operator to start the vehicle, switches 54 and 46 are caused to close. Closing of switch 56 closes the circuit path between fast charge-discharge battery 58 and electric motor 12, thereby permitting vehicle throttle 60 linked to speed control rheostat 62 to control the speed of electric motor 12. Also with switch 54 closed, starter motor 64 causes I.C. engine 22 to be started to run in the optimum mode of substantially constant speed and power level with starter motor ceasing operation upon start up of I.C. engine 22.

CRUISE MODE LOGIC OUTPUT SIGNAL 48

The system of FIG. 1 is shown operating with all switches and clutch positions in the cruise mode. With cruise mode signal 48 present, switches 64, 65, and 66 are held in the closed circuit position as shown. With switches 64, 65, and 66 in the closed circuit position, power is applied to electromagnetically operated clutches 14, 74, and 75. Clutch 14, since power is applied (switch 66 being closed) is in its energized condition which is open (as shown by the solid line representation of the opposing clutch plates), while clutch 74 in its energized condition is open (as shown by the solid line representation of the opposing clutch plates). With switch 65 also energized to a closed position (also by the presence of cruise signal 48), clutch 75 is held in an energized closed position (as shown in the solid line representation of the clutch plates).

Recalling that cruise mode logic output signal 48 is present in an ON condition and I.C. engine 22 is running in the optimum mode at a substantially constant speed and power output level, it can be seen that power is transmitted from I.C. motor 22 through clutch 75 to transmission 23 and wheels 28. In this cruise mode of operation, clutch 74 is uncoupled from electric generator 78.

CRUISE MODE OFF CONDITION OF OPERATION

When there is no cruise mode logic output signal 48 present because the two conditions for cruise mode are not present, viz., the motor vehicle is not traveling above a predetermined level (e.g., 40 mph) and has not been traveling above such predetermined level, the predetermined time interval (e.g., 45 seconds), then upon such cruise mode OFF condition, switches 64, 65, and 66 are in their open and deenergized positions (indicated by the dotted line representations).

With switch 66 in open position, clutch 14 plates are in their relaxed (dotted line) closed position permitting normal throttle 60 operation of linked speed control rheostat 62 to control the speed of electric motor 12, and consequently accelerate the motor vehicle through clutch 14, transmission 13, and wheels 18. Recalling that upon closing of switch 52 in starter circuit 50, switch 54 closed starting starter motor 64 and started I.C. engine 22, which starter motor becomes deenergized upon detection of start up of I.C. engine 22, even though switch 54 is shown closed during entire engine operation, in which switch 52 also remains closed. Switch 56, since also energized closed during entire vehicle operation (through start up closure of switch 52), permits fast discharge battery 58 to power electric motor 12 upon throttle 60 demand. In this cruise mode OFF condition of operation, when the motor vehicle is operating under electric power, since there is no cruise mode logic output signal 48 present to close switches 64, 65, and 66, clutch 14 remains closed (dotted line representation), while clutch 75 is deenergized by switch 65 to the uncoupled position, and clutch 74, since deenergized, reverts to the closed position, as represented by clutch plate movement to the dotted line position (as also represented by the direction of motion, e.g., electric power dotted line representation). During this cruise mode OFF condition, I.C. motor 22 is seen driving electric generator 78 through clutch 74, which causes battery charger 90 to charge fast charge-discharge battery 58. Fast charge-discharge battery 58 comprises a battery capable of faster charge than the current lead acid batteries, e.g., a nickel cadmium battery, capacitor-battery storage device, e.g., as shown in U.S. Pat. No. 3,615,829 to Sprague issued Oct. 26, 1971, or other fast charge-discharge battery. While a fast charge-discharge battery 58 is shown in the present system to accept power from I.C. motor 22 driven generator 78, further combinations of batteries and storage devices, such as lead acid batteries and/or capacitor energy storage, may be used in combination with the fast charge-discharge battery, which is capable of rapidly storing energy delivered during cruise mode OFF condition of operation.

ELECTRIC POWER TAKEOVER FROM CRUISE MODE

In certain operating circumstances, e.g., fast pass to overtake another vehicle when operating in the cruise mode, it may be desirable or necessary to revert to electric power. This can be accomplished by the operator quickly depressing throttle 60 to full throttle closing switch contact 92, thereby generating reset signal 94 to reset timer 40, causing an absence of cruise mode logic output signal 48 and reversion to electric power operation. As soon as cruise conditions are again met, a cruise mode logic output signal 48 will again be provided to return operation to cruise mode under power of I.C. motor 22.

EMERGENCY I.C. ENGINE POWER

In the event of an inoperable electric power condition under cruise mode OFF condition of operation due, e.g., to failed electric motor 12 or fast charge battery 58, it may become necessary to power the motor vehicle to a service area under sole power of low horsepower I.C. engine 22, and this may be accomplished in the present system by closing manual I.C. switch 96, which will close clutch 75, thereby permitting I.C. engine 22 to transmit power through transmission 23 to wheels 28.

RANDOM TIME PERIOD ILLUSTRATIVE OF SYSTEM RESPONSE DUE TO CHANGING MOTOR VEHICLE OPERATING CONDITIONS

Figure 2:
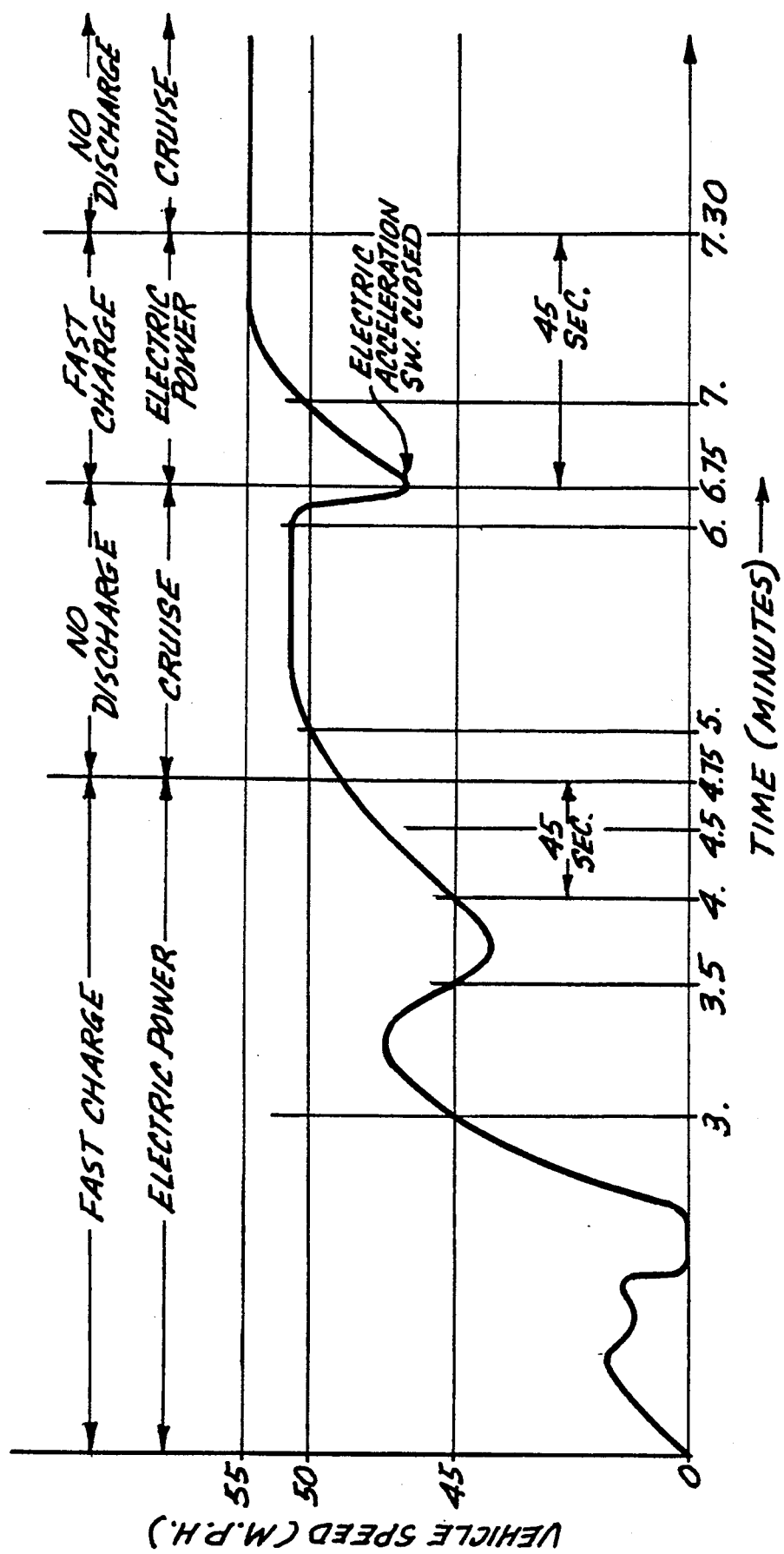
FIG. 2 is a graph illustrative of operating parameters of the system of FIG. 1, wherein the ordinate is representative of vehicle speed and the abscissa is representative of time; and, FIG. 3 is a system block diagram of a further embodiment of the invention.

The significant advantages which are inherent in the system of FIG. 1, which can be demonstrated from the vehicle operating graph of FIG. 2, include the following:

1. All the advantages and characteristics of an electric propulsion system are retained, including smooth no-stall acceleration with no pollution until the motor vehicle is brought up to a predetermined speed for a predetermined time period (into the cruise mode). Present I.C. powered motor vehicles offer substantial pollution control problems during acceleration.

2. Only a low power I.C. engine is required, since it is required to deliver only a small amount of power during cruise mode. Therefore, the added horsepower capacity required for acceleration in present I.C. powered vehicles (but not required during cruise) is eliminated.

3. Relatively constant speed and power demand from the I.C. engine in the cruise mode permits operation at a point of greatest efficiency and lowest emissions. For best efficiency of operation of a 3-way catalytic converter (98 in FIG. 1), the I.C. engine (22 in FIG. 1) can be operated at stoichiometric.

4. During non-cruise mode operation when electric propulsion is utilized in the present system of FIG. 1, low power I.C. engine 22, which continues to run, is utilized to transfer its power output into electric power which is captured and conserved in fast charge-discharge battery 58. Substantial loss of energy output from I.C. engine 22 would occur without the fast charge-discharge characteristics of battery 58. Further energy storage device(s) may be utilized in combination with fast charge-discharge battery 58 (e.g., a lead acid battery pack, capacitor batteries, etc. ) and different ones or combinations may have power drawn therefrom by electric motor 12; but essential efficiency in the present system is provided through utilization of a fast charge-discharge battery to aid in capturing and preventing power loss provided by constantly running I.C. engine 22.

Many further advantages, including the economic ones necessary to a successful commercial production thereof, will become readily apparent to those system designers skilled in the art, particularly since only a simple electric motor and low polluting small I.C. engine having minimal pollution control costs are required in the system of FIG. 1.

Turning now to FIG. 2 for an overview of system operation with respect to the embodiment of FIG. 1, it should be noted that starting out at time=0, the vehicle is under electric motor 12 propulsion. Under electric power, clutch 14 is engaged, clutch 74 is engaged, and clutch 75 is disengaged. Under electric power, the two conditions hereinbefore mentioned which are required to provide cruise mode logic output signal 48 are not satisfied, viz., speed above a predetermined level for a predetermined period of time. While at 3 minutes speed is in excess of the exemplary predetermined level of 45 mph, this condition of speed in excess of 45 mph does not exist for the predetermined time period of 45 seconds but falls below 45 mph at time=3.5 minutes or 30 seconds. Such conditions would reflect typical city driving conditions. Again, at time=4 minutes, the first condition for cruise mode of speed exceeding 45 mph is satisfied. The second condition for cruise mode becomes satisfied at time=4.75 minutes, since the first condition of speed exceeding 45 mph has been maintained for the predetermined time period, viz., 45 seconds. Now, during electric propulsion occurring until time=4.75 minutes, the electric power source, including fast charge-discharge battery 58, is being discharged to power electric motor 12. Also, with clutch 74 engaged, I.C. motor 22 is charging fast charge-discharge battery 90 through electric generator 78 and battery charger 90. As hereinbefore mentioned, power from continuously running low horsepower I.C. motor 22 is not lost but rapidly captured through the charge capability of fast charge-discharge battery 58. Also, as hereinbefore mentioned, the electric power source, besides including fast charge-discharge battery 58, may include further electrical energy storage capacity, e.g., lead acid batteries and capacitor batteries with electric power supplied to electric motor 12 from such electric power source.

During cruise mode operation between time=4.75 minutes and time=6.75 minutes, cruise mode output signal 48 disengages clutch 14, and clutch 74, while causing clutch 75 to become engaged, with clutch 75 engaged low horsepower I.C. engine 22 (e.g., 20 to 30 percent of the horsepower of an equivalent weight I.C.-only powered state-of-the-art vehicle) drives wheels 28 through transmission 23 during, and as along as, cruise mode conditions are satisfied. Since clutch 74 is disengaged with clutch plates apart in an open condition, electric generator 78 is not being driven to charge fast charge-discharge battery 58. Also, since clutch 14 is disengaged, electric motor 12 is not operative to drive wheels 18. There is neither charging or discharging of electrical energy storage, including fast charge-discharge battery 58.

Notice that at time=6 minutes while in the cruise mode, the speed of the vehicle is dropping, as might occur on a steep upward incline such as in a mountain pass. Realizing the loss of vehicle speed, the operator of the vehicle desires instant powerful acceleration as can be provided by electric propulsion from electric motor 12. The operator depresses throttle pedal to the floor making contact with switch 92, thereby generating reset signal 94, which resets timer 40, causing cruise mode output signal 48 to turn OFF, thereby causing clutch 14 to return to an engaged condition, and clutch 75 to become disengaged. Until the first and second cruise mode conditions again become satisfied (such as at time=7.30 minutes), the vehicle does not return to the cruise mode. And upon return to the cruise mode, if the operator still needs hill-climbing power, instant full depression of throttle 60 will again close contact 92 to again generate reset signal 94.

Manual I.C. switch 96 hereinbefore discussed, permits the operator to power the vehicle in the event of some failure in the electrical propulsion system, e.g., failures in electrical energy storage or electric motor 12 failure.

Figure 3:
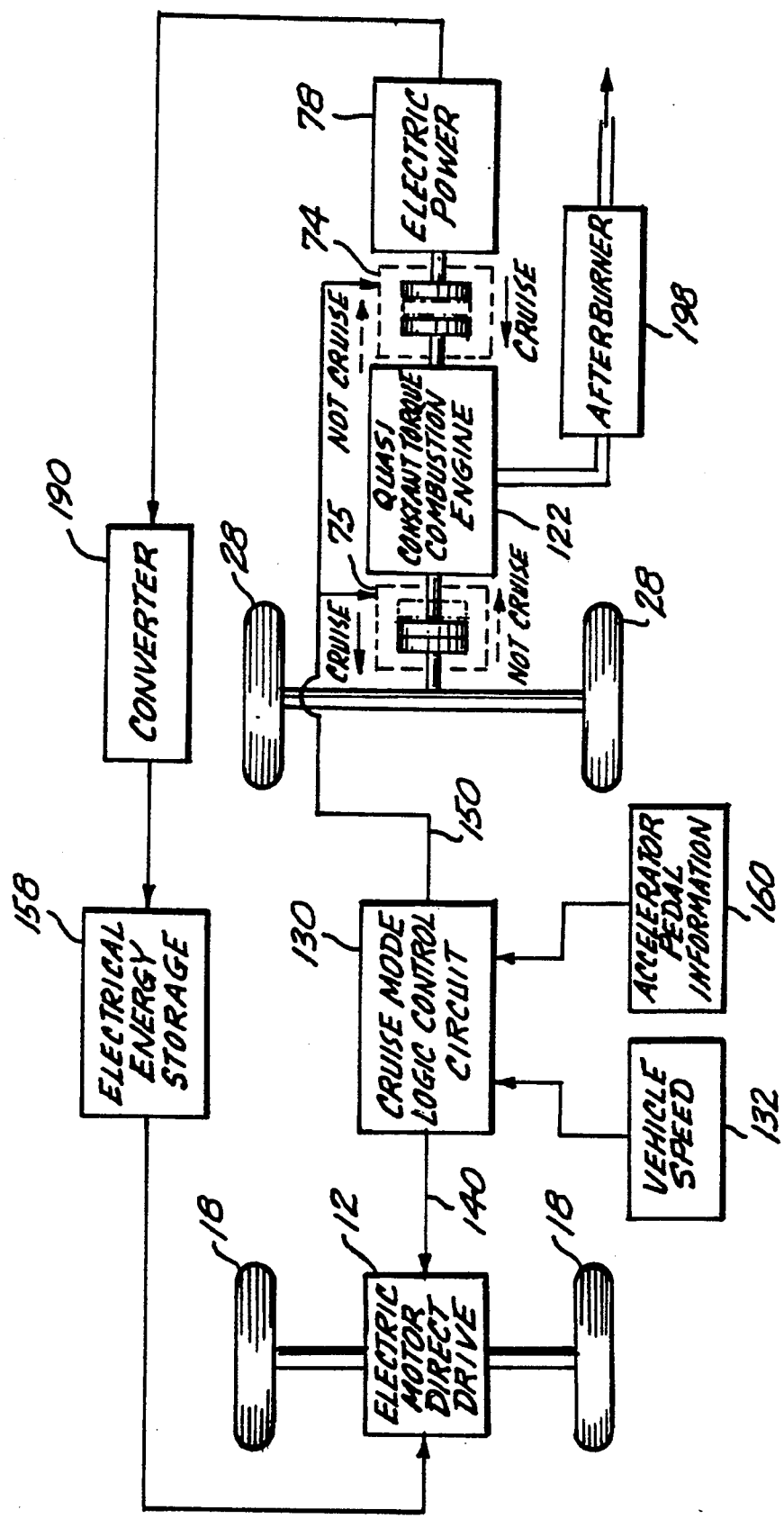

Turning now to a further embodiment of the invention shown in the block diagram of FIG. 3, it can be seen that as in the system of FIGS. 1 and 2, in the cruise mode, power is derived from a combustion engine 122 coupled through a clutch 75 to drive wheels 28, while in a non-cruise mode, clutch 75 is disengaged and combustion engine 122 provides electric power which is converted by converter 190 for storage in electrical energy storage device 158. Cruise mode logic control circuit 130 is responsive to a plurality of vehicle operating parameters, e.g., vehicle speed 132 and accelerator pedal information 160 so as to provide cruise mode logic output control signals 140 and 150 to control operation of electric motor 12 and quasi constant torque combustion engine 122. Quasi constant torque combustion engine 122 may be, e.g., an I.C. engine or an external combustion engine, such as a low power Stirling engine, and a pollution processing apparatus 198 can be utilized, such as an afterburner as shown. Electric motor 12 may be a DC motor or an induction motor; however, if an induction motor is used, then an inverter will be required to convert DC from the fast charge-discharge battery and other DC storage batteries 158 to AC.

It will become apparent to those skilled in the art that cruise mode logic control circuit 130 may comprise a microprocessor response to further vehicle operating parameters. In the use of a microprocessor, further fine-tuning of the present system embodiments may be provided, e.g., to vary the responses to the aforementioned cruise mode control parameters of vehicle speed and predetermined time periods at such speed and predetermined time periods as desired, or such microprocessor may detect loss of vehicle speed in the cruise mode and automatically revert to electric propulsion. The microprocessor may be further programmed to also control clutch functions and transmission functions as desired, to synchronize their operation in the system.

The microprocessor may be further utilized by the programmer to also control electrical energy storage 158, e.g., by utilizing the I.C. engine during cruise mode OFF condition to charge one fast charge-discharge battery while utilizing a further fast charge-discharge battery previously fast charged to power the electric motor, and then switching the further fast charge-discharge battery to the charging path of the I.C. engine during the next cruise mode OFF condition. The microprocessor may further switch to a further battery to power the vehicle in the event no fast charge-discharge power source is adequately charged to power the vehicle and return to a fast charge-discharge battery when sufficiently fast charged. F actors such as rate of charge of fast charge-discharge batteries and power consumption of the electric motor are considerations for the system designers and programmers.

Further features and modifications of the present system embodiments which are merely exemplary will become apparent to those skilled in the art during commercial production development, and such differences and variations are not deemed to fall outside the scope of the invention as defined only by the following claims:

I claim:

1. In combination in a motor vehicle having a first pair of wheels and a second pair of wheels:
    an electric motor;
    a combustion engine;
    a fast charge-discharge battery for transferring electrical energy to said electric motor;
    a cruise mode control circuit having preprogrammed cruise mode operating conditions which includes a cruise mode on condition when the vehicle operating speed exceeds a predetermined level and for a predetermined time interval and a cruise mode off condition when the cruise mode operating conditions have not been satisified, said control circuit automatically activating first coupling means for connecting said electric motor to one of said first and second pairs of wheels during the cruise mode off condition and automatically activating second coupling means for connecting said combustion engine to one of said first and second pairs of wheels during the cruise mode on condition;
    said cruise mode control circuit activating third coupling means for connecting said combustion engine to an electric power generator for charging said fast charge-discharge battery during the cruise mode off condition; and
    user controlled means bypassing said control circuit for activating said first coupling means for connecting said electric motor to one of said first and second pairs of wheels during the cruise mode on condition, and user controlled means bypassing said control circuit for activating said second coupling means for connecting said combustion engine to one of said first and second pairs of wheels in the event of failure of said fast charge-discharge battery.

2. The vehicle according to claim 1, wherein said first coupling means connects the electric motor to said first pair of wheels.

3. The vehicle according to claim 1, wherein said second coupling means connects the combustion engine to said second pair of wheels.

4. In combination in a motor vehicle having a first pair of wheels and a second pair of wheels:
    an electric motor;
    a combustion engine;
    a fast charge-discharge battery for transferring electrical energy to said electric motor;
    a cruise mode control circuit having preprogrammed cruise mode operating conditions which includes a cruise mode on condition when the vehicle operating speed exceeds a predetermined level and for a predetermined time interval and a cruise mode off condition when the cruise mode operating conditions have not been satisified, said control circuit automatically activating first coupling means for connecting said electric motor to one of said first and second pairs of wheels and deactivating second coupling means for disconnecting said combustion engine from one of said first and second pairs of wheels during the cruise mode off condition and said control circuit automatically activating said second coupling means for connecting said combustion engine to one of said first and second pairs of wheels and deactivating said first coupling means for disconnecting said electric motor from one of said first and second pairs of wheels during the cruise mode on condition;

said cruise mode control circuit activating third coupling means for connecting said combustion engine to an electric power generator for charging said fast charge-discharge battery during the cruise mode off condition; and user controlled means bypassing said control circuit for activating said first coupling means for connecting said electric motor to one of said first and second pairs of wheels during the cruise mode on condition, and user controlled means bypassing said control circuit for activating said second coupling means for connecting said combustion engine to one of said first and second pairs of wheels in the event of failure of said fast charge-discharge battery.

5. The vehicle according to claim 4, wherein said first coupling means connects the electric motor to said first pair of wheels.

6. The vehicle according to claim 4, wherein said second coupling means connects the combustion engine to said second pair of wheels.

* * * * *